(12) United States Patent
Boeckmann et al.

(10) Patent No.: US 10,280,296 B2
(45) Date of Patent: May 7, 2019

(54) PROCESS FOR PRODUCING ACRYLATE RUBBER WITH REDUCED COAGULATE FORMATION

(71) Applicant: INEOS STYROLUTION GROUP GMBH, Frankfurt (DE)

(72) Inventors: Philipp Boeckmann, Bad Duerkheim (DE); Wolfgang Fischer, Walldorf (DE); Hans-Juergen Hausser, Kaiserslautern (DE)

(73) Assignee: INEOS STYROLUTION GROUP GMBH (DE)

( * ) Notice: Subject to any disclaimer, the term of this patent is extended or adjusted under 35 U.S.C. 154(b) by 133 days.

(21) Appl. No.: 15/300,037

(22) PCT Filed: Mar. 26, 2015

(86) PCT No.: PCT/EP2015/056570
§ 371 (c)(1),
(2) Date: Sep. 28, 2016

(87) PCT Pub. No.: WO2015/150223
PCT Pub. Date: Oct. 8, 2015

(65) Prior Publication Data
US 2017/0145201 A1 May 25, 2017

(30) Foreign Application Priority Data
Mar. 31, 2014 (EP) .................................... 14162554

(51) Int. Cl.
*C08L 25/12* (2006.01)
*C08F 2/00* (2006.01)
*C08F 2/26* (2006.01)
*C08F 265/04* (2006.01)

(52) U.S. Cl.
CPC .............. *C08L 25/12* (2013.01); *C08F 2/002* (2013.01); *C08F 2/26* (2013.01); *C08F 265/04* (2013.01); *C08L 2205/03* (2013.01)

(58) Field of Classification Search
CPC .. C08L 25/12; C08F 2/002; C08F 2/26; C08F 265/04
See application file for complete search history.

(56) References Cited

U.S. PATENT DOCUMENTS

| 3,691,260 A | 9/1972 | Mittnacht et al. |
| 4,634,734 A | 1/1987 | Hambrecht et al. |
| 4,788,253 A | 11/1988 | Hambrecht et al. |
| 5,196,480 A | 3/1993 | Seitz et al. |
| 5,367,029 A * | 11/1994 | Fischer ................. C08F 265/04 525/279 |
| 6,054,531 A | 4/2000 | Craig |
| 6,177,517 B1 | 1/2001 | Guntherberg et al. |
| 8,440,764 B2 | 5/2013 | Niessner |
| 9,809,733 B2 * | 11/2017 | Niessner .............. C08K 5/0016 |
| 9,982,123 B2 * | 5/2018 | Kopping ............... C08F 265/06 |
| 2011/0275763 A1 | 11/2011 | Niessner |
| 2016/0297957 A1* | 10/2016 | Boeckmann ............ C08L 25/14 |

FOREIGN PATENT DOCUMENTS

| DE | 1911882 A1 | 9/1970 |
| DE | 3149358 A1 | 6/1983 |
| DE | 19503545 A1 | 8/1996 |
| EP | 0139971 A2 | 5/1985 |
| EP | 0450485 A2 | 3/1991 |
| WO | 2007/142473 A1 | 12/2007 |

OTHER PUBLICATIONS

M.S.A. Palma, "Effect of monomer feed rate on the properties of copolymer butyl acrylate/vinyl acetate in semi-batch emulsion polymerization," Indian J. Chem. Tech., vol. 14, Sep. 2007, pp. 515-522.
M. Zubitur and J.M. Asua, "Factors affecting kinetics and coagulum formation during the emulsion copolymerization of styrene/butyl acrylate," Polymer, 42, 2001, pp. 5979-5985.
J.E. Vandegaer, "Latex Growth," J. Applied Polymer Sci., vol. 9, 1965, pp. 2929-2938.

* cited by examiner

*Primary Examiner* — Hannah J Pak
(74) *Attorney, Agent, or Firm* — J.A. Lindeman & Co., PLLC

(57) ABSTRACT

A process for producing a thermoplastic molding composition comprising: 10% to 40% by weight of a graft copolymer A comprising 50% to 70% by weight, based on A, of a graft base A1 formed from an elastomeric, crosslinked acrylic ester polymer and 30% to 50% by weight of a graft shell A2, 50% to 90% by weight of a hard matrix B formed from copolymers of styrene or α-methylstyrene and acrylonitrile, 0% to 50% by weight of a further graft copolymer C, 0% to 15% by weight of additives D, wherein the reaction for preparation of the acrylic ester polymer A and/or the reaction for preparation of C is conducted in the presence of 0.01 to 4 times the molar amount of sodium carbonate, based on the sum total of the molar amount of initiator used in the preparation of the graft base and graft shell, leads to lower coagulate formation.

21 Claims, No Drawings

PROCESS FOR PRODUCING ACRYLATE RUBBER WITH REDUCED COAGULATE FORMATION

The present invention relates to an optimized production process for acrylate rubbers. The process takes place via emulsion polymerization, and can be optimized by using an improved buffer system during the production of the graft copolymer. It is thus possible to achieve a significant reduction of the extent of coagulate formation and deposits in the reaction vessel, with a resultant increase in yield and in product purity.

Production of copolymers made of styrene monomers and nitrile monomers (hard component) is known to the person skilled in the art: production of styrene-acrylonitrile copolymers (SAN) is described in U.S. Pat. No. 8,440,764 (Styrolution), and also in Kunststoff-Handbuch [Plastics Handbook] (Vieweg-Daumiller, volume V, Polystyrol [Polystyrene], Carl-Hanser-Verlag, Munich, 1969, p. 124, line 12 ff.).

Production of graft copolymers with use of a rubber is disclosed in EP-A 0450485, DE 19503545, and DE 3149358. Production of styrene-acrylonitrile copolymer molding compositions using at least one acrylate rubber is presented in US 2011/0275763. WO 2007/142473 describes acrylonitrile-styrene-acrylate copolymers (ASA) and use thereof in thermoplastic compositions.

The effects of various parameters on coagulate formation in the pre-emulsion during the production of acrylic rubbers are described by Palma et al. (Indian J. Chem. Technol. 2007, 14(5), 515). Coagulate formation is said to decrease slightly with up to four hours of monomer addition, whereas with more than six hours of monomer addition coagulate formation increases dramatically.

Zubitur et al. (Polymer 2001, 42(14), 5979) studied the effects of the agitation stage, of monomer addition time, of initiation rate, and of rubber viscosity on coagulate formation during emulsion polymerization of styrene and butyl acrylate. The studies reveal that with thermal initiation direct monomer reaction is relatively slow and a minimal agitation stage is required in order to avoid coagulate formation.

In contrast, redox initiation proceeds relatively quickly, and the agitation stage therefore assumes an even more important role for preventing coagulate formation. Coagulate formation is also shown to increase with the viscosity of the reaction mixture.

In the industrial-scale process it is often impossible to achieve satisfactory setting of the reaction parameters, and there can be undesired attendant side reactions. There is therefore a need for an optimized process for production of thermoplastic molding compositions with acrylate rubbers with little coagulate formation.

The present invention provides an optimized production process for obtaining acrylate rubbers with little coagulate formation, and also with a reduced extent of deposits and encrustation in the reaction vessel. In this process for producing the graft copolymer(s) (in particular ASA) the polymerization uses an initiator, often the initiator potassium peroxodisulfate (PPS).

The invention provides a process for the production of a thermoplastic molding composition comprising the following components:
from 10 to 40% by weight, often from 20 to 39.9% by weight, of at least one graft copolymer A comprising
from 50 to 70% by weight, based on A, of a graft base A1 made of an elastomeric, crosslinked acrylate polymer and from 30 to 50% by weight, based on A, of a graft shell A2 made of a vinylaromatic monomer and of a polar, copolymerizable, ethylenically unsaturated monomer, in a ratio by weight of from 80:20 to 65:35,
from 50 to 90% by weight, often from 60 to 89.9% by weight, of a hard matrix B made of one or more copolymers of styrene, α-methylstyrene, acrylonitrile, methyl methacrylate, and/or phenylmaleimide,
from 0 to 50% by weight of another graft copolymer C which differs from the graft copolymer A and which has an average particle diameter (weight average) in the range from 200 to 800 nm, comprising
from 50 to 80% by weight, based on C, of an elastomeric crosslinked acrylate polymer C1 which differs from A1,
from 2.5 to 25% by weight, often from 5 to 25% by weight, based on C, of a first graft shell C2 made of a vinylaromatic monomer and of from 10 to 45% by weight, often from 15 to 40% by weight, based on C, of a second graft shell C3 made of a mixture of a vinylaromatic monomer C31 and of a polar, copolymerizable, ethylenically unsaturated monomer C32, where the ratio by weight of C31 to C32 is from 90:10 to 60:40, and
from 0 to 15% by weight, often from 0.1 to 5% by weight of one or more additives D,
where the entirety of A and B, and optionally C and D, gives 100% by weight, and where the reaction for the production of the acrylate polymer A and/or the reaction for the production of the copolymer C is carried out in the presence of a molar quantity of sodium carbonate which is from 0.01 to 4 times the total molar quantity of initiator, in particular PPS, used in the production of the graft base and graft shell.

In each of the polymerization steps, the quantity of the initiator used (in particular PPS) is generally from 0.05 to 1.2% by weight, in particular from 0.1 to 0.6% by weight, based on the weight of the monomers used.

The desired particle size of the graft copolymer can be established during production of the graft polymers A and C by way of the juncture, and the quantity, of sodium carbonate addition.

The invention preferably provides a process where the graft base A1 is composed of from 55 to 65% by weight, based on A, of acrylate polymer particles with average size/diameter (weight average) from 50 to 120 nm, and the graft shell A2 is composed of from 35 to 45% by weight, based on A, of styrene and acrylonitrile.

The invention also provides a process for the production of a thermoplastic molding composition where the quantity of sodium carbonate used in the production of the graft copolymers A and/or C is from 0.01 to 2.5 mol, based on the sum of the molar quantities of initiator, in particular PPS, used in the graft base and graft shell.

The invention also provides a process for the production of a thermoplastic molding composition where the particle size distribution factor Q of the graft base A1 is from 0.01 to 0.5, in particular from 0.1 to 0.4.

The invention also provides a process for the production of a thermoplastic molding composition where the size (the average diameter) of the particles after the graft reaction is in the range from 70 to 150 nm.

The invention also provides a process for the production of a thermoplastic molding composition where the appropriate quantity of sodium carbonate is first dissolved in a starting material and then introduced to the polymerization.

The invention also provides for a process for the production of a thermoplastic molding composition where the quantity of coagulate formed in connection with the graft shell A2 is in the range from 0.01 to 0.5% by weight, based on the quantity of the graft copolymer A.

The invention also provides a process for the production of a thermoplastic molding composition where a sodium carbonate solution is added together with a PPS solution preferably continuously during the graft copolymerization (production of A and/or C).

The invention also provides the use for the production of moldings, films, or coatings of the thermoplastic molding composition obtained.

The invention also provides moldings, films, and coatings made of thermoplastic molding compositions produced by the process described.

The invention also provides a process where the particle size distribution factor Q of the graft copolymer particles is from 0.1 to 0.4 and the average particle size after the graft reaction is in the range from 50 to 150 nm.

The invention preferably provides a process with additional use of a large-particle component C whose average particle size after the graft reaction is in the range from 300 to 700 nm.

Another aspect of the invention is a process for the production of a thermoplastic molding composition which comprises:

from 50 to 90% by weight, often from 60 to 79.9% by weight, of a hard matrix B made of one or more copolymers of styrene, α-methylstyrene, acrylonitrile, methyl methacrylate, and/or phenylmaleimide, from 10 to 50% by weight, often from 20 to 39.9% by weight, of a graft copolymer C with an average particle size (weight average) in the range from 200 to 800 nm, comprising from 50 to 80% by weight, based on C, of an elastomeric crosslinked acrylate polymer C1, from 2.5 to 25% by weight, based on C, of a first graft shell C2 made of a vinylaromatic monomer and of from 10 to 45% by weight, based on C, of a second graft shell C3 made of a mixture of a vinylaromatic monomer C31 and of a polar, copolymerizable, ethylenically unsaturated monomer C32, where the ratio by weight of C31 to C32 is from 90:10 to 60:40, and from 0 to 15% by weight, often from 0 to 5% by weight, frequently from 0.1 to 5% by weight, of one or more additives D, where the entirety of B and C, and optionally D, gives 100% by weight, and where the reaction for the production of the acrylate polymer C is carried out in the presence of a molar quantity of sodium carbonate which is from 0.01 to 4 times the total molar quantity of initiator, in particular PPS, used in the production of the graft base and graft shell. The invention also provides the corresponding molding compositions and use thereof.

With this process for the production of a thermoplastic molding composition it is preferably possible to keep the coagulate formation of the graft shell of component C in the range from 0.01 to 0.5% by weight, based on the total weight of the graft copolymer C. The abovementioned preferred embodiments can also be used for this further production process. The invention also provides the use and the moldings, films, and coatings obtained from the thermoplastic polymer composition.

Component A

The thermoplastic (molding) compositions preferably comprise from 10 to 40% by weight, often from 20 to 39.9% by weight (based on the entirety of all components) of a graft copolymer A. Component A is a graft copolymer composed of an elastomeric, crosslinked acrylate polymer A1 as graft base and of (at least) one graft shell A2.

Component A1 used can be an acrylate having from 1 to 8 carbon atoms, preferably from 4 to 8 carbon atoms in the alkyl moiety. It is particularly preferable to use the alkyl acrylates n-butyl and ethylhexyl acrylate. The acrylates can be used alone or else in a mixture with one another in the production of the acrylate polymers serving as graft base. The quantity of component A1 used is from 50 to 70% by weight, preferably from 55 to 65% by weight, particularly preferably from 58 to 65% by weight, based on component A.

In order to crosslink the acrylate polymers A1, the polymerization is carried out in the presence of from 0.1 to 5% by weight, preferably from 0.5 to 3% by weight, based on all of the monomers used in the production of the graft base, of a copolymerizable polyfunctional, crosslinking monomer.

Monomers which are suitable as these polyfunctional crosslinking monomers preferably comprise two, or optionally more, ethylenic double bonds which are capable of copolymerization and are not 1,3-conjugated. Examples of suitable monomers are divinylbenzene, diallyl maleate, diallyl fumarate, and diallyl phthalate. The acrylate of tricyclodecenyl alcohol has proven advantageous (cf. DE 1 260 935, which also provides information for the production process described below); another name for this compound is dihydrodicyclopentadienyl acrylate (DCPA).

The graft base A1 is first produced, by polymerizing the acrylate(s) and the crosslinking monomer, optionally together with other comonomers, in aqueous emulsion in a manner known per se. The usual emulsifiers are used in quantities of from 0.5 to 5% by weight, based on the monomers. It is preferable to use the sodium salts of alkylsulfonates or fatty acids having from 10 to 18 carbon atoms. Operations are generally carried out with a water-to-monomers ratio of from 2:1 to 0.7:1.

Polymerization initiators used are preferably the familiar persulfates, e.g. potassium peroxodisulfate (PPS). In principle it is also possible to use redox systems; the molar quantity of redox initiator then corresponds to the quantity of PPS.

Other polymerization aids used in the invention are the buffer substances sodium carbonate (or potassium carbonate), and optionally molecular weight regulators such as mercaptans, terpinols, or dimeric α-methylstyrene. Mention should also be made of buffer solutions comprising alkali metal hydroxides, e.g. sodium hydroxide or potassium hydroxide.

The molar quantity of the buffer substances (such as sodium carbonate) used is from 0.01 to 4 times, often from 0.05 to 3 times, the total molar quantity of initiator, in particular PPS, used in the production of the graft base and graft shell. An example of a possible quantity of the buffer substances used is from 0.01 to 1% by weight, based on the graft base A1.

The buffer substance can be used entirely as initial charge at the start of the production process for the graft base A1; it can also be added to the reaction mixture continuously and separately during the graft copolymerization, continuously in combination with the polymerization initiator during the graft copolymerization, and/or at a subsequent juncture in the polymerization.

The graft shell A2 is composed firstly of vinylaromatic compounds, such as styrene, α-methylstyrene, or ring-alkylated styrene, and secondly of polar copolymerizable, ethylenically unsaturated monomers, e.g. acrylonitrile, alkyl methacrylate having from 1 to 4 carbon atoms in the alkyl moiety, acrylic acid, maleic anhydride, acrylamide, or vinyl methyl ether. This graft shell is preferably in turn grafted in aqueous emulsion onto the graft base rubber (i.e. emulsion) A1. The graft copolymerization and the emulsion polymerization for the production of the graft base can take place in the same system with, if necessary, addition of further emulsifier, buffer substance, and initiator.

The quantity of the graft shell A2 used is from 30 to 50% by weight, preferably from 35 to 45% by weight, based on component A. The ratio by weight of the vinylaromatic compound (e.g. styrene) of the graft shell A2 to the polar copolymerizable, ethylenically unsaturated monomer (e.g. acrylonitrile) is often from 80:20 to 65:35. The ratio by weight of styrene to acrylonitrile present is preferably about 75:25. In another preferred embodiment the ratio by weight of styrene to acrylonitrile present is 77:23.

The monomer mixture to be applied by grafting can be added to the reaction mixture all at once, in a plurality of stages, or preferably continuously during the polymerization reaction. The conduct of the graft copolymerization is such that the resultant degree of grafting in the graft copolymer A is from 30 to 50%, preferably from 35 to 45%.

The degree of grafting here relates to the ratio by mass of graft core to the entirety of graft core and graft shell:

degree of grafting [%]=(m(graft shell)*100)/(m(graft base)+m(graft shell)).

Component B

The thermoplastic (molding) compositions comprise from 50 to 90% by weight (based on the entirety of all components) of at least one styrene copolymer B. Component B is known to the person skilled in the art and can be produced by way of widely used processes, e.g. by free-radical polymerization.

The expression styrene copolymers can in particular mean SAN or other, rubber-free styrene copolymers. Examples of component B are widely used copolymer matrices, for example styrene-acrylonitrile copolymers (SAN) produced by bulk polymerization, emulsion polymerization, or solution polymerization. Mixtures of polymer matrices, e.g. SAN plus PMMA, polyamide, or polycarbonate, are also suitable, as described by way of example in Ulmann's Encyclopedia of Industrial Chemistry (VCH-Verlag, 5$^{th}$ edition, 1992, pp. 633 ff.).

It is particularly preferable that component B comprises acrylonitrile as α,β-unsaturated component, and also styrene and/or α-methylstyrene as aromatic vinylic component.

Another embodiment of the invention produces a molding composition comprising one or more styrene copolymers B where this styrene copolymer B is composed of two or three monomers from the group of styrene, acrylonitrile, and/or α-methylstyrene. The hard matrix B is preferably produced from the components acrylonitrile and styrene, and/or α-methylstyrene by bulk polymerization or in the presence of one or more solvents. Preference is given here to copolymers B with molar masses $M_w$ of from 15 000 to 300 000 g/mol, where the molar masses can be determined by way of example via light scattering in tetrahydrofuran (GPC with UV detection).

Component B is preferably produced by means of bulk polymerization, emulsion polymerization, or solution polymerization. The polymerization is particularly preferably carried out in the presence of from 0 to 20% by weight, based on the entire mixture, of aromatic solvents, such as toluene, xylene, or ethylbenzene. Further details relating to the production of component B can also be found in Kunststoff-Handbuch [Plastics Handbook] (Vieweg-Daumiller, volume V Polystyrol [Polystyrene], Carl-Hanser-Verlag, Munich, 1969, p. 124, lines 12 ff.).

The hard matrix B can comprise by way of example:
(Ba) polystyrene-acrylonitrile produced from, based on (Ba), from 60 to 85% by weight of styrene and from 15 to 40% by weight of acrylonitrile, or
(Bb) poly-α-methylstyrene-acrylonitrile produced from, based on (Bb), from 60 to 85% by weight of α-methylstyrene and from 15 to 40% by weight of acrylonitrile, or
(Bc) a mixture of the copolymer matrix (Ba) with the copolymer matrix (Bb).

The copolymer matrix B can also be obtained via copolymerization of acrylonitrile, styrene, and α-methylstyrene.

Component C

The thermoplastic (molding) compositions comprise from 0 to 50% by weight (based on the entirety of all components) of a graft copolymer C. Component C is a graft copolymer composed of at least one elastomeric crosslinked acrylate polymer C1 as graft base and at least two graft shells C2 and C3. A crosslinked acrylate polymer is also used as graft base C1 for the production of the second graft copolymer C. The information provided for component A is also applicable to the production of the graft base C1.

The intention is that the graft copolymer C differs from the graft copolymer A in having large particles, specifically an average particle diameter or average particle size (weight average) in the range of about 200 to 800 nm, preferably in the range from 300 to 700 nm. It is desirable that this large-particle graft copolymer C has a narrow particle size distribution, and it is advantageous here that the quotient $Q=(d_{90}-d_{10})/d_{50}$ is smaller than 0.3, preferably smaller than 0.2. Large-particle crosslinked acrylate polymers suitable as graft base C1 can be obtained by the known processes for the production of large-particle dispersions, and advantageously by the seed latex method described in DE 1 911 882 for the production of ASA polymers.

This method is used to subject a small-particle crosslinked acrylate polymer rubber (polymer latex) which has an intermediate particle diameter, i.e. particle diameter preferably below 120 nm, and which has been obtained as described via emulsion polymerization of acrylate, of crosslinking monomers, and also optionally of other comonomers, to a further polymerization via addition of further monomers, emulsifier, and optionally buffer substance. The conditions here are adjusted (cf. Journal of Applied Polymer Science, vol. 9 (1965), pp. 2929-2938) in such a way that the polymer particles of the seed latex continue to grow, but no new latex particles are formed. An initiator is generally used.

The particle size of the resultant large-particle rubber can be adjusted as desired by varying the quantitative ratio of seed latex to monomers.

Production of the second graft copolymer C of the invention begins with use of a vinylaromatic monomer, in particular styrene, or else optionally α-methylstyrene or a ring-alkylated styrene, such as p-methylstyrene or tert-butylstyrene in the presence of the previously produced large particle rubber C1.

The graft copolymerization and the emulsion polymerization for the production of the graft base A can advantageously be undertaken in the same system; further emulsifier, buffer substance, and initiator can be added here.

The monomer to be applied by grafting, in particular styrene, can be added to the reaction mixture all at once, in batches in a plurality of stages, or preferably continuously during the polymerization.

The conduct of the graft copolymerization in the graft copolymer C is such that the resultant degree of grafting is from 2.5 to 25% by weight, preferably from 10 to 20% by weight.

The graft copolymerization is then continued in a second stage with a monomer mixture, i.e. at least one vinylaromatic monomer, in particular styrene, and at least one copolymerizable polar monomer, in particular acrylonitrile, in a ratio of from 90:10 to 60:40, preferably from 80:20 to 65:35. Examples of vinylaromatic monomers have already been mentioned in the description of the first graft stage. An example of a polar copolymerizable, ethylenically unsaturated monomer is acrylonitrile. Compounds that can be used apart from acrylonitrile are alkyl methacrylates having from 1 to 4 carbon atoms in the alkyl moiety, acrylic acid, maleic anhydride, acrylamide, and/or vinyl methyl ether. Preference is given to acrylonitrile, ethyl acrylate, methyl methacrylate, or a mixture of these. Particular preference for the $2^{nd}$ grafting stage is given especially to styrene and acrylonitrile, and also to α-methylstyrene and acrylonitrile, and also to styrene, acrylonitrile, and methyl methacrylate. Again the second step of the graft copolymerization is advantageously carried out in the existing system; further emulsifier and initiator can be added here if necessary. Again, the monomer mixture to be applied by grafting can be added all at once, in batches in a plurality of stages, or preferably continuously. The conduct of the graft polymerization is such as to achieve a degree of grafting in the graft copolymer C of from 10 to 45% by weight, preferably from 15 to 40% by weight.

Component D

The thermoplastic compositions optionally comprise, as further component D, from 0 to 15% by weight, often from 0.1 to 15% by weight, frequently also from 0.1 to 5% by weight (based on the entirety of all components) of one or more additives (auxiliaries and additional substances) which differ from components A to C. Mention may be made here of organic esters, particulate mineral fillers, processing aids, stabilizers and oxidation retarders, agents to counter decomposition due to heat and decomposition due to ultraviolet light, lubricants and mold-release agents, flame retardants, dyes and pigments, and plasticizers.

The term esters means low-molecular-weight compounds. It is also possible in the present invention to use two or more of these compounds. The molar mass of the compounds is generally smaller than 3000 g/mol, preferably smaller than 150 g/mol.

Particulate mineral fillers can by way of example be provided by amorphous silica, carbonates such as magnesium carbonate, calcium carbonate (chalk), powdered quartz, mica, a very wide variety of silicates such as clays, muscovite, biotite, suzoite, tin maletite, talc powder, chlorite, phlogopite, feldspar, calcium silicates such as wollastonite, or kaolin, particularly calcined kaolin.

It is possible to use fibrous fillers such as carbon fibers, potassium titanate whiskers, aramid fibers, or preferably glass fibers, where the length of at least 50% by weight of the fibrous fillers (glass fibers) is more than 50 mm. It is preferable that the length of at least 70% by weight of the glass fibers is more than 60 μm. The length of the glass fibers relates to a finished molding which is obtained by way of example by injection molding. When the glass fibers are added to the molding compositions here, the former can already have been divided into the appropriate lengths or else can take the form of continuous-filament strands (rovings).

The expression UV stabilizers includes by way of example various substituted resorcinols, salicylates, benzotriazoles, and benzophenones, the quantities which can generally be used of these being up to 2% by weight.

Oxidation retarders and heat stabilizers can be added to the thermoplastic molding composition in the invention. The following can be used: sterically hindered phenols, hydroquinones, substituted members of this group, secondary aromatic amines, optionally in conjunction with phosphorus-containing acids or salts thereof, and mixtures of these compounds, preferably in concentrations of up to 1% by weight, based on the weight of the mixture.

It is moreover possible in the invention to add lubricants and mold-release agents, the quantities added to the thermoplastic composition of these being generally up to 1% by weight. Mention may be made here of stearic acid, stearyl alcohol, alkyl stearates and stearamides, preferably Irganox®, and also esters of pentaerythritol with long-chain fatty acids.

It is possible to use the calcium, zinc, or aluminum salts of stearic acid, and also dialkyl ketones, for example distearyl ketone. It is moreover also possible to use ethylene oxide-propylene oxide copolymers as lubricants and mold-release agents. Natural, and also synthetic, waxes can moreover be used. Mention may be made of PP waxes, PE waxes, PA waxes, grafted PO waxes, HDPE waxes, PTFE waxes, EBS waxes, montan wax, carnauba wax and beeswax.

Flame retardants can be not only halogen-containing but also halogen-free compounds. Suitable halogen compounds remain stable during the production and processing of the molding composition of the invention, and no corrosive gases are therefore liberated; brominated compounds are more preferable than the chlorinated compounds here. It is preferable to use halogen-free compounds, for example phosphorus compounds, in particular phosphine oxides and derivatives of phosphorus acids, and salts of phosphorus acids and of phosphorus acid derivatives.

It is particularly preferable that phosphorus compounds comprise ester groups, alkyl groups, cycloalkyl groups, and/or aryl groups. Oligomeric phosphorus compounds with molar mass smaller than 2000 g/mol as described by way of example in EP-A 0 363 608 are likewise suitable.

The materials can moreover comprise pigments and dyes. The quantities comprised of these are generally from 0 to 15% by weight, preferably from 0.1 to 10% by weight, and in particular from 0.5 to 8% by weight. Pigments for the coloring of thermoplastics are well known; see by way of example R. Gachter and H. Müller, Taschenbuch der Kunststoffadditive [Plastics additives handbook], Carl Hanser Verlag, 1983, pp. 494-510. A first preferred group of pigments that may be mentioned is that of white pigments such as zinc oxide, zinc sulfide, white lead (2 $PbCO_3 \cdot Pb(OH)_2$), lithopones, antimony white, and titanium dioxide. Of the two most familiar crystalline forms of titanium dioxide (rutile and anatase) it is in particular the rutile form that is used for the white coloring of the molding compositions of the invention.

Black pigments that can be used in the invention are iron oxide black ($Fe_3O_4$), spinel black ($Cu(Cr, Fe)_2O_4$), manganese black (a mixture of manganese dioxide, silicon oxide, and iron oxide), cobalt black, and antimony black, and also particularly preferably carbon black, which is mostly used in the form of furnace black or gas black; (in this connection see G. Benzing, Pigmente für Anstrichmittel [Pigments for paints], Expert-Verlag (1988), pp. 78ff). It is of course possible to use inorganic chromatic pigments such as chrome oxide green or organic chromatic pigments such as azo pigments and phthalocyanines in the invention in order to establish particular hues. Pigments of this type are generally obtainable commercially. It can moreover be advantageous to use the pigments/dyes mentioned in a mixture, an example being carbon black with copper phthalocyanines, thus generally facilitating color dispersion in the thermoplastics.

The production process of the invention leads to articles with reduced coagulate formation and encrustation in the reaction vessel, and also with good mechanical properties in comparison with the prior art. The low level of coagulate formation can significantly improve yield and can increase product purity. The process optimization of the invention improves the production of not only small-particle but also large-particle graft copolymers.

Production of small-particle graft polymers (from 50 to 150 nm), and also of large-particle graft polymers (from 200 to 800 nm), is described in general terms in EP-A 0450485.

Butyl acrylate is often added when a solution of a salt, preferably sodium carbonate or potassium carbonate, is added as polymerization aid. The pH can be adjusted to from 6 to 10 during the polymerization.

The polymerization can then be carried out. The resultant rubber can then be grafted with a mixture of styrene and acrylonitrile.

For production of the thermoplastic molding composition it is preferable to mix a melt of the "hard" copolymer B (e.g. SAN) intimately with the graft copolymer A (produced with use of buffer), and optionally with the graft copolymer C and the additives D, at a temperature above 200° C. Alternatively, the copolymer B can be mixed with the graft copolymer C and the additives D.

Any of the known methods can be used for the blending of components A and B, optionally with the graft copolymer C and the additives D (or components B, C, and D). If, by way of example, the components have been produced by emulsion polymerization it is possible by way of example to mix the resultant polymer dispersions with one another, and then to precipitate the polymers together, and to work up the polymer mixture. However, it is particularly preferable to blend components A and B, and optionally the graft copolymer C and the additives D, by extruding, kneading, or rolling the components together, where the components have if necessary been isolated in advance from the solution or aqueous dispersion obtained during the polymerization. Graft copolymerization products (component A and optionally C) which have been obtained from aqueous dispersion can also be subjected to only partial dewatering, and can be mixed in the form of moist crumb with hard component B (e.g. SAN). However, a factor that must be taken into consideration is complete drying of the graft copolymers during the mixing procedure.

The thermoplastic compositions of the invention can be processed by the conventional processes for thermoplastics processing, e.g. extrusion and injection molding, to give various moldings, e.g. children's and other furniture for indoor and outdoor use, bodywork parts, boats, signs, and street lamp covers.

The examples and claims provide further explanation of the invention.

EXAMPLES

Re: Test Methods:

Modulus of elasticity is determined in accordance with ISO 5272:1993.

Average particle size, defined via the d50 value of the particle size distribution, is measured with the aid of HDC (Hydrodynamic Chromatography, W. Wohlleben, H. Schuch in "Measurement of Particle Size Distribution of Polymer Latexes", 2010, eds.: L. Gugliotta, J. Vega, p. 130-153).

Notched impact resistance ($kJ/m^2$) is measured in accordance with DIN 53 453 (ISO 179 1eA).

The MVR (220/10) is determined in accordance with ISO 1133.

Re: General Production Process:

The compositions are produced by mixing the respective components intimately in an extruder (ZSK 30 twin-screw extruder from Werner & Pfleiderer) at a temperature of 240° C.

After the experiment, the coagulate of the graft polymer A is isolated by filtration, dried, and weighed. Deposits/encrustation on the plant components (e.g. vessel wall, agitator) was evaluated by each of 5 staff, working independently of the others.

A) Production of Small-Particle Graft Copolymer (Particle Size 100 nm)

The graft base A is produced by analogy with EP-A 0450485 (graft copolymer A; see p. 7, line 11). The appropriate salt here (in an appropriate quantity) is first dissolved in the starting material, and the polymerization is then carried out as described in EP 0450485. Experiment comp. 6 was carried out analogously for comparison.

The acrylate graft polymer C and hard component B (SAN copolymer) are produced by analogy with EP 0450485. The experiments were carried out with 3.2 kg of graft rubber.

a1) Production of Graft Base

All data are in parts by weight. 16 parts by weight of butyl acrylate (BA) and 0.4 part by weight of dihydrodicyclopentadienyl acrylate (DCPA) are heated to 60° C., with stirring, in 150 parts by weight of water with addition of one part of the sodium salt of a C12-C18-paraffinsulfonic acid, 0.3 part by weight of potassium peroxodisulfate, and the corresponding stated quantities of sodium carbonate and, respectively, sodium bicarbonate (see table 1). 10 minutes after the polymerization reaction had begun, a mixture of 82 parts by weight of butyl acrylate and 1.6 parts by weight of DCPA was added within a period of 3 hours. The mixture was allowed to continue reaction for a further hour after monomer addition had ended.

The solids content of the resultant rubber of the cross-linked butyl acrylate polymer was 40% by weight. Particle size distribution was narrow (quotient Q=0.20).

a2) Production of Graft Copolymer 4200 g of the emulsion produced in accordance with specification (a1) were mixed with 2300 g of water and 5.4 g of potassium peroxodisulfate and heated to 65° C., with stirring. Once the reaction temperature had been reached, a mixture of 840 g of styrene and 280 g of acrylonitrile was metered into the mixture over the course of 3 hours. Once the addition had ended, the emulsion was kept at 65° C. for a further 2 hours. The graft polymer was precipitated from the emulsion by using calcium chloride solution at 95° C., washed with water, and dried in a stream of warm air. Table 1 lists the average particle sizes of the resultant graft copolymers.

b) Production of Corresponding Molding Compositions

The thermoplastic molding compositions were produced by incorporating the particulate graft polymers described above into a hard component, i.e. the SAN copolymer (75:25). Incorporation can be achieved by way of example in that the particulate graft polymer(s) is/are isolated (precipitated) from the emulsion by adding an electrolyte and then, optionally after drying, is/are mixed with the hard component (SAN) by extruding, kneading, or rolling the materials together.

c) Production of Large-Particle Graft Copolymers C c1) Production of Graft Base

The following are added to a starting material made of 2.5 parts by weight of the rubber produced as described in a1): 50 parts by weight of water and 0.1 part by weight of potassium peroxodisulfate over the course of 3 hours, and then firstly a mixture of 49 parts by weight of butyl acrylate and 1 part by weight of DCPA, and secondly a solution of 0.5 part by weight of the sodium carbonate and, respectively, sodium bicarbonate of a $C_{12}$- to $C_{18}$-paraffinsulfonic acid in 25 parts by weight of water. The temperature of the starting material here was 60° C. Once the feed had ended, polymerization was continued for two hours. The solids content of the resultant rubber was 40%. The average particle size (weight average) of the rubber was determined as 410 nm.

c2) Production of Graft Copolymer 150 parts by weight of the rubber obtained in c1) were mixed with 15 parts by weight of styrene and 60 parts by weight of water, and heated for 3 hours to 65° C., with stirring, after addition of a further 0.03 part by weight of potassium peroxodisulfate and 0.05 part by weight of lauroyl peroxide. The resultant dispersion was polymerized for a further 4 hours with 25 parts by weight of a mixture of styrene and acrylonitrile in a ratio of 75:25, and precipitated by using calcium chloride solution at 95° C., and the product was isolated, washed with water, and dried in a stream of warm air. The degree of grafting was determined as 40%.

d) Mixtures with SAN

A possible effect on the abovementioned mechanical properties of the thermoplastic molding composition was investigated by using mixtures produced from the resultant graft copolymers (experiments 1, 3, and comp. 6) with a commercially available hard component, SAN copolymer made of styrene and acrylonitrile (75:25). The ratio by weight of SAN matrix to graft copolymer here is 70:30.

TABLE 1

Comparison of particle size (after graft reaction), pH (at the end of the reaction), coagulate formation and encrustation under various conditions. Experiments 1 to 5 vary the quantity of $Na_2CO_3$, and experiment comp. 6 is buffered with $NaHCO_3$ during the reaction (Rk). The theoretical weight of the entire mixture is 3.2 kg. The molar quantity of the salt used as buffer is stated, based on the PPS used as initiator (graft base and graft shell together).

| Experiment | Salt used (molar quantity) | Particle size (after graft reaction Rk in nm) | pH (at end of reaction Rk) | Coagulate (g) | Encrustation (independent evaluation) |
|---|---|---|---|---|---|
| 1 | $Na_2CO_3$: 0.1 | 75 | 5.4 | 3.3 | very little |
| 2 | $Na_2CO_3$: 1.0 | 92 | 7.3 | 5 | little |
| 3 | $Na_2CO_3$: 1.25 | 98 | 7.5 | 5 | little |
| 4 | $Na_2CO_3$: 1.9 | 114 | 7.8 | 5 | little |
| 5 | $Na_2CO_3$: 2.5 | 132 | 8.1 | 5 | little |
| comp. 6 | $NaHCO_3$: 2.0 | 99 | 7.5 | 23 | very substantial |

As can be seen in table 1, coagulate formation, and also encrustation, in the reaction vessel is at a minimum when the quantity of $Na_2CO_3$ is 0.1 (molar quantity, based on total PPS); however, this does not change greatly for any quantity of $Na_2CO_3$ from 1.0 to 2.5.

In contrast, experiment comp. 6 exhibits a high level of coagulate formation, and also substantial encrustation in the reaction vessel with use of $NaHCO_3$.

Achievement of a particle size of about 100 nm after the grafting reaction preferably requires only 1.25 mol of $Na_2CO_3$, based on PPS, instead of 2.0 mol of $NaHCO_3$, based on PPS. A smaller quantity of buffer salt is therefore required for an identical size of the graft polymer particles.

TABLE 2

Comparison of particle size ($D_{50}$ after graft reaction), pH (at the end of the reaction), coagulate formation, and wall encrustation under various conditions. Experiments 7 to 13 vary the molar quantity of $Na_2CO_3$ (based on total PPS), and experiment comp. 14 reveals the results in a reaction buffered with $NaHCO_3$. The theoretical weight of the entire mixture is 3.2 kg.

| | Mol. quantity of $Na_2CO_3$, based on $PPS_{total}$ | pH (at the end of the reaction) | HDC ($D_{50}$) | Dried coagulate (weighed) g | Wall encrustation |
|---|---|---|---|---|---|
| 7 | 0.1 | 4.3 | 572 | 1.2 | very little |
| 8 | 0.5 | 7.1 | 571 | 1 | very little |
| 9 | 1 | 7.5 | 567 | 1.5 | very little |
| 10 | 1.25 | 7.6 | 592 | 2 | very little |
| 11 | 1.5 | 7.9 | 654 | 1.8 | very little |
| 12 | 2 | 8.2 | 817 | 2.1 | very little |
| 13 | 2.5 | 8.3 | 964 | 7.4 | little |
| Comparison using $NaHCO_3$ instead of $Na_2CO_3$ | | | | | |
| comp. 14 | 2 | 7.7 | 666 | 16.8 | substantial |

TABLE 3

Comparison of mechanical properties and processability of the graft copolymer products blended with SAN (75:25) from experiments 1 (small quantity of sodium carbonate), 3 (larger quantity of sodium carbonate), and comp. 6 (larger quantity of sodium hydrogencarbonate).

| Rubber from experiment | MVR (220/10) | Modulus of elasticity (MPa) | Notched impact resistance Ak [kJ/m²], 23° C. |
|---|---|---|---|
| 1 | 5.5 | 2521 | 3.48 |
| 3 | 5.4 | 2495 | 3.83 |
| comp. 6 | 5.8 | 2529 | 3.19 |

From table 3 it is apparent that there is no adverse effect on the mechanical properties of the moldings produced with SAN when the $Na_2CO_3$-buffered graft copolymers are used: MVR (melt flow rate) and modulus of elasticity are unchanged in comparison with the comparative experiment comp. 6 within the bounds of measurement tolerances, and notched impact resistance is improved.

What is claimed is:

1. A process for the production of a thermoplastic molding composition comprising:
   from 10 to 40% by weight of at least one graft copolymer A comprising
     from 50 to 70% by weight, based on A, of a graft base A1 made of an elastomeric, crosslinked acrylate polymer, and
     from 30 to 50% by weight, based on A, of a graft shell A2 made of a vinylaromatic monomer and of a polar, copolymerizable, ethylenically unsaturated monomer, in a ratio by weight of from 80:20 to 65:35,
   from 50 to 90% by weight of a hard matrix B made of one or more copolymers of styrene, α-methylstyrene, acrylonitrile, methyl methacrylate, and/or phenylmaleimide,
   from 0 to 50% by weight of another graft copolymer C which differs from the graft copolymer A and which has an average particle diameter in the range from 200 to 800 nm, comprising from 50 to 80% by weight, based on C, of an elastomeric crosslinked acrylate polymer C1 which differs from A1, from 2.5 to 25% by weight, based on C, of a first graft shell C2 made of a vinylaromatic monomer, and from 10 to 45% by weight, based on C, of a second graft shell C3 made of a mixture of a vinylaromatic monomer C31 and of a polar, copolymerizable, ethylenically unsaturated monomer C32, where the ratio by weight of C31 to C32 is from 90:10 to 60:40, and from 0 to 15% by weight of one or more additives D, where the entirety of A and B, and optionally C and D, gives 100% by weight, and where the reaction for the production of the graft copolymer A and the reaction for the production of the graft copolymer C is carried out in the presence of a molar quantity of sodium carbonate which is from 0.01 to 4 times the total molar quantity of initiator used in the production of the graft base and graft shell of graft copolymers A and C.

2. The process for the production of a thermoplastic molding composition as claimed in claim 1, where the graft base A1 is composed of from 55 to 65% by weight, based on A, of acrylate polymer particles with average size from 50 to 120 nm and the graft shell A2 is composed of from 35 to 45% by weight, based on A, of styrene and acrylonitrile.

3. The process for the production of a thermoplastic molding composition as claimed in claim 1, where the particle size distribution factor Q of the graft base A1 is from 0.01 to 0.5.

4. The process for the production of a thermoplastic molding composition as claimed in claim 1, where the quantity of coagulate formed in connection with the graft shell A2 is in the range from 0.01 to 0.5% by weight, based on the total weight of the graft copolymer A.

5. The process for the production of a thermoplastic molding composition as claimed in claim 1, where the quantity of sodium carbonate used in the production of the graft copolymers A and/or C is from 0.01 to 2.5 mol based on the sum of the molar quantities of initiator, used in the graft base and graft shell of graft copolymers A and/or C.

6. The process for the production of a thermoplastic molding composition as claimed in claim 1, where the molding composition comprises from 1 to 50% by weight of at least one graft copolymer C which differs from the graft copolymer A.

7. The process for the production of a thermoplastic molding composition as claimed in claim 1, where the molding composition comprises from 0.1 to 15% by weight of at least one additive D.

8. The process for the production of a thermoplastic molding composition as claimed in claim 1, where the molding composition comprises from 1 to 50% by weight of at least one graft copolymer C and the graft copolymer C has an average particle diameter in the range from 300 to 700 nm.

9. The process for the production of a thermoplastic molding composition as claimed in claim 1, where the sodium carbonate is first dissolved in a starting material for the production of the graft copolymer A and the graft copolymer C.

10. A process for the production of a thermoplastic molding composition comprising:

from 50 to 90% by weight of a hard matrix B made of one or more copolymers of styrene, α-methylstyrene, acrylonitrile, methyl methacrylate, and/or phenylmaleimide, from 10 to 50% by weight of a graft copolymer C with an average particle size in the range from 200 to 800 nm, comprising from 50 to 80% by weight, based on C, of an elastomeric crosslinked acrylate polymer C1, from 2.5 to 25% by weight, based on C, of a first graft shell C2 made of a vinylaromatic monomer, and from 10 to 45% by weight, based on C, of a second graft shell C3 made of a mixture of a vinylaromatic monomer C31 and of a polar, copolymerizable, ethylenically unsaturated monomer C32, where the ratio by weight of C31 to C32 is from 90:10 to 60:40, and from 0 to 15% by weight of one or more additives D, where the entirety of B and C, and optionally D, gives 100% by weight, and where the reaction for the production of the graft copolymer C is carried out in the presence of a molar quantity of sodium carbonate which is from 0.01 to 4 times the total molar quantity of initiator used in the production of the graft base and graft shell of graft copolymer C.

11. The process for the production of a thermoplastic molding composition as claimed in claim 10, where the quantity of coagulate formed in connection with the graft shell of component C is in the range from 0.01 to 0.5% by weight, based on the total weight of the graft copolymer C.

12. A molding, a film, or a coating comprising a thermoplastic molding composition produced by the process as claimed in claim 1.

13. The process as claimed in claim 1, wherein the initiator is PPS.

14. The process as claimed in claim 10, wherein the initiator is PPS.

15. The process for the production of a thermoplastic molding composition as claimed in claim 3, where the particle size distribution factor Q of the graft base A1 is from 0.1 to 0.4.

16. The process for the production of a thermoplastic molding composition as claimed in claim 5, where the quantity of sodium carbonate used in the production of the graft copolymers A and/or C is from 0.01 to 2.5 mol, based on the sum of the molar quantities PPS used in the graft base and graft shell.

17. The process for the production of a thermoplastic molding composition as claimed in claim 5, where the quantity of sodium carbonate used in the production of the graft copolymers A and/or C is from 0.1 to 2.5 mol, based on the sum of the molar quantities of initiator used in the graft base and graft shell of graft copolymers A and/or C.

18. The process for the production of a thermoplastic molding composition as claimed in claim 7, where the molding composition comprises from 0.1 to 5% by weight of at least one additive D.

19. The process for the production of a thermoplastic molding composition as claimed in claim 10, wherein the initiator is PPS.

20. The process for the production of a thermoplastic molding composition as claimed in claim 10, where the molding composition comprises from 0.1 to 5% by weight of one or more additives D.

21. The process for the production of a thermoplastic molding composition as claimed in claim 10, wherein the reaction for the production of the graft copolymer C is carried out in the presence of a molar quantity of sodium carbonate which is from 0.1 to 2.5 times the total molar quantity of initiator used in the production of the graft base and graft shell of graft copolymer C.

\* \* \* \* \*